(12) United States Patent
Robitaille et al.

(10) Patent No.: US 12,192,084 B2
(45) Date of Patent: Jan. 7, 2025

(54) METHOD FOR DEVICES IN A NETWORK TO PARTICIPATE IN AN END-TO-END MEASUREMENT OF LATENCY

(71) Applicant: Accedian Networks Inc., Saint-Laurent (CA)

(72) Inventors: Claude Robitaille, St-Placide (CA); Pierre Trudeau, Lorraine (CA)

(73) Assignee: ACCEDIAN NETWORKS INC., Saint-Laurent (CA)

( * ) Notice: Subject to any disclaimer, the term of this patent is extended or adjusted under 35 U.S.C. 154(b) by 0 days.

(21) Appl. No.: 18/070,608

(22) Filed: Nov. 29, 2022

(65) Prior Publication Data

US 2023/0093388 A1    Mar. 23, 2023

Related U.S. Application Data

(63) Continuation of application No. 17/188,443, filed on Mar. 1, 2021, now Pat. No. 11,575,590, which is a (Continued)

(51) Int. Cl.
*H04L 43/0852* (2022.01)
*H04L 43/106* (2022.01)
*H04L 43/50* (2022.01)

(52) U.S. Cl.
CPC ........ *H04L 43/0858* (2013.01); *H04L 43/106* (2013.01); *H04L 43/50* (2013.01)

(58) Field of Classification Search
None
See application file for complete search history.

(56) References Cited

U.S. PATENT DOCUMENTS 6,535,983 B1   3/2003   McCormack et al.
6,545,979 B1   4/2003   Poulin
(Continued)

FOREIGN PATENT DOCUMENTS

EP    1215559 A2    6/2002
JP    S6113414 A    1/1986
(Continued)

OTHER PUBLICATIONS

Extended European Search Report for European Application No. 05779215.2, mailed Sep. 27, 2013, 6 Pages.
(Continued)

*Primary Examiner* — Jason E Mattis
*Assistant Examiner* — Bao G Nguyen

(57) ABSTRACT

A method of determining the latency of path segments in a communication network that uses multi-bit data packets comprises generating a test packet for use in determining the latency of path segments in the network; transmitting the test packet from a first device coupled to the network; storing in the test packet the time when a preselected bit in the test packet is transmitted from the first device; when the test packet is received by a second device coupled to the network, storing in the second device at least one of (a) the time when a preselected bit in the test packet is received by the second device and (b) the difference between (i) the time when the preselected bit in the test packet is transmitted from the first device and (ii) the time when the test packet is received by the second device.

20 Claims, 6 Drawing Sheets

Related U.S. Application Data continuation of application No. 16/101,970, filed on Aug. 13, 2018, now Pat. No. 10,999,171, which is a continuation of application No. 15/672,531, filed on Aug. 9, 2017, now Pat. No. 10,091,081, which is a continuation of application No. 14/735,508, filed on Jun. 10, 2015, now Pat. No. 9,762,469, which is a continuation of application No. 14/451,763, filed on Aug. 5, 2014, now Pat. No. 9,088,492, which is a continuation of application No. 13/542,449, filed on Jul. 5, 2012, now Pat. No. 8,830,860.

(56) References Cited

U.S. PATENT DOCUMENTS

| | | |
|---|---|---|
| 6,604,136 B1 | 8/2003 | Chang et al. |
| 6,715,087 B1 | 3/2004 | Vergnaud et al. |
| 6,868,094 B1 | 3/2005 | Bordonaro et al. |
| 7,113,485 B2 | 9/2006 | Bruckman |
| 7,114,091 B2 | 9/2006 | Vrancic |
| 7,242,693 B1 | 7/2007 | Acharya et al. |
| 7,257,123 B2 | 8/2007 | Choi et al. |
| 7,281,141 B2 | 10/2007 | Elkayam et al. |
| 7,283,568 B2 | 10/2007 | Robie, Jr. et al. |
| 7,286,482 B2 | 10/2007 | Charcranoon |
| 7,310,664 B1 | 12/2007 | Merchant et al. |
| 7,463,731 B2 | 12/2008 | Beyda et al. |
| 7,478,251 B1 | 1/2009 | Diab et al. |
| 7,519,006 B1 | 4/2009 | Wing |
| 7,710,905 B2 | 5/2010 | Dyck et al. |
| 7,787,438 B2 | 8/2010 | Dowse |
| 7,873,057 B2 | 1/2011 | Robitaille et al. |
| 7,889,660 B2 | 2/2011 | Bugenhagen |
| 7,936,700 B2 | 5/2011 | Yamazaki et al. |
| 8,121,111 B2 | 2/2012 | Freiberger |
| 8,189,487 B1 | 5/2012 | Mateski et al. |
| 8,218,576 B2 | 7/2012 | Hansson et al. |
| 8,705,341 B2 | 4/2014 | Robitaille et al. |
| 8,983,288 B2 | 3/2015 | Freiberger |
| 2001/0000071 A1 | 3/2001 | Nichols |
| 2003/0091029 A1 | 5/2003 | Jo et al. |
| 2003/0093513 A1 | 5/2003 | Hicks et al. |
| 2003/0115321 A1 | 6/2003 | Edmison et al. |
| 2003/0115368 A1 | 6/2003 | Wu |
| 2004/0078483 A1 | 4/2004 | Simila et al. |
| 2004/0105391 A1 | 6/2004 | Charcranoon |
| 2004/0136713 A1 | 7/2004 | Lim et al. |
| 2004/0164619 A1 | 8/2004 | Parker et al. |
| 2004/0165595 A1 | 8/2004 | Holmgren et al. |
| 2005/0078700 A1 | 4/2005 | Thompson et al. |
| 2005/0099949 A1 | 5/2005 | Mohan et al. |
| 2005/0099951 A1 | 5/2005 | Mohan et al. |
| 2005/0099952 A1 | 5/2005 | Mohan et al. |
| 2005/0144328 A1 | 6/2005 | McBeath |
| 2005/0148314 A1 | 7/2005 | Taglienti et al. |
| 2005/0198240 A1 | 9/2005 | Widera et al. |
| 2005/0271072 A1 | 12/2005 | Anderson et al. |
| 2006/0051088 A1 | 3/2006 | Lee et al. |
| 2007/0274227 A1* | 11/2007 | Rauscher ............... H04L 43/50 370/252 |
| 2008/0005354 A1 | 1/2008 | Kryskow et al. |
| 2009/0046585 A1 | 2/2009 | Faraj |
| 2009/0161569 A1 | 6/2009 | Corlett |
| 2009/0185501 A1* | 7/2009 | Huang ............... H04L 43/026 370/252 |
| 2009/0190482 A1 | 7/2009 | Blair |
| 2009/0304007 A1* | 12/2009 | Tanaka ............... H04L 45/66 370/395.53 |
| 2010/0195517 A1 | 8/2010 | Kihara |
| 2010/0283682 A1 | 11/2010 | Heidari-Bateni et al. |
| 2011/0038270 A1* | 2/2011 | Martin ............... H04L 43/0852 370/252 |
| 2012/0075999 A1 | 3/2012 | Ko et al. |
| 2012/0106453 A1 | 5/2012 | Li et al. |
| 2012/0218879 A1 | 8/2012 | Robitaille et al. |
| 2012/0230348 A1* | 9/2012 | Pannell ............... H04L 47/245 370/437 |
| 2012/0257641 A1 | 10/2012 | Hansson et al. |
| 2012/0300859 A1* | 11/2012 | Chapman ............... H04J 3/0664 375/257 |
| 2013/0010600 A1 | 1/2013 | Jocha et al. |
| 2013/0170388 A1 | 7/2013 | Ito et al. |
| 2013/0322255 A1 | 12/2013 | Dillon |
| 2014/0010094 A1 | 1/2014 | Robitaille et al. |
| 2014/0043992 A1 | 2/2014 | Le Pallec et al. |
| 2014/0328356 A1* | 11/2014 | Cachin ............... H04L 7/0008 370/509 |
| 2015/0172091 A1 | 6/2015 | Che |
| 2016/0197944 A1 | 7/2016 | Allouche et al. |
| 2017/0359255 A1 | 12/2017 | Manghirmalani et al. |
| 2020/0052989 A1* | 2/2020 | Robitaille ............ H04L 43/106 |
| 2021/0184955 A1* | 6/2021 | Robitaille ............ H04L 43/50 |

FOREIGN PATENT DOCUMENTS

| | | |
|---|---|---|
| JP | 2002026947 A | 1/2002 |
| JP | 2004200933 A | 7/2004 |
| WO | 2004104080 A1 | 12/2004 |
| WO | 2005025013 A1 | 3/2005 |
| WO | 2006033611 A1 | 3/2006 |
| WO | 2006114687 A2 | 11/2006 |
| WO | 2014006484 A1 | 1/2014 |

OTHER PUBLICATIONS

Fasbender A., et al., "On Assessing Unidirectional Latencies in Packet-Switched Networks", IEEE International Conference on Communications, vol. 1, Jun. 8, 1997, pp. 490-494.

International Search Report and Written Opinion for International Application No. PCT/IB2013/001432, mailed Nov. 25, 2013, 9 Pages.

International Search Report and Written Opinion for International Application No. PCT/SE2005/001307, mailed Dec. 6, 2005, 9 Pages.

International Search Report for International Application No. PCT/IB2006/001000, mailed Nov. 14, 2006, 3 Pages.

International Telecommunication Union: "Series G: Transmission Systems and Media, Digital Systems and Networks", ITU-T, G.8013/Y.1731, Jul. 2011, 92 Pages.

International Telecommunication Union: "Series Y: Global Information Infrastructure, Internet Protocol Aspects and Next-Generation Networks", ITU-T, Y. 1564, Mar. 2011, 38 Pages.

International Written Opinion for International Application No. PCT/IB2006/001000, mailed Nov. 14, 2006, 6 Pages.

Mills D., et al., "Network Time Protocol Version 4 Protocol and Algorithms Specification", Internet Engineering Task Force, Request for Comments 5905, Jun. 2010, pp. 1-110.

Ohta H., "Standardization Status on OAM and QoS Issues for Carrier-Class Ethernet", The Institution of Electronics, Information and Communication Engineers Technical Report, CS2004-79-87 [Communication System], Oct. 21, 2004, vol. 104, No. 380, pp. 29-34.

Otha A., "Introduction of Detail Mechanism of Ether OAM", The Institution of Electronics, Information and Communication Engineers Technical Report, CS2004-79-87 [Communication System], Oct. 21, 2004, vol. 104, No. 380, pp. 35-40.

Pezaros D.P., et al., "Low-Overhead End-to-End Performance Measurement for Next Generation Networks", IEEE Transactions on Network and Service Management, vol. 8, No. 1, Mar. 2011, pp. 1-14.

Sivrikaya F., et al., "Time Synchronization in Sensor Networks: A Survey", IEEE Network, Jul.-Aug. 2004, pp. 45-50.

Supplementary European Search Report in corresponding European Patent Application No. 06744558.5-1853 (PCT/IB2006/001000), mailed Jul. 17, 2014, 15 Pages.

(56) References Cited

OTHER PUBLICATIONS

Vito L.D., et al., "One-Way Delay Measurement: State of the Art", IEEE Transactions on Instrumentation and Measurement, vol. 57, No. 12, Dec. 2008, pp. 2742-2750.

* cited by examiner

METHOD FOR DEVICES IN A NETWORK TO PARTICIPATE IN AN END-TO-END MEASUREMENT OF LATENCY

This application is a continuation of and claims priority to U.S. patent application No. 17/188,443, filed Mar. 1, 2021, now allowed, which is a continuation of and claims priority to U.S. patent application No. 16/101,970, filed Aug. 13, 2018, now U.S. Pat. No. 10,999,171, which is a continuation of U.S. patent application No. 15/672,531, filed Aug. 9, 2017, now U.S. Pat. No. 10,091,081, which is a continuation of U.S. patent application No. 14/735,508, filed Jun. 10, 2015, now U.S. Pat. No. 9,762,469, which is a continuation of U.S. patent application No. 14/451,763, filed Aug. 5, 2014, now U.S. Pat. No. 9,088,492, which is a continuation of U.S. patent application No. 13/542,449, filed Jul. 5, 2012, now U.S. Pat. No. 8,830,860, each of which is hereby incorporated by reference herein in its entirety.

FIELD OF THE INVENTION

This invention is directed towards creating a method for devices in a network to participate in an end-to-end measurement of latency and also determine segment by segment latency without additional messaging in the network.

BACKGROUND OF THE INVENTION

When an Ethernet circuit (or other type of circuit) is activated in a network, there is a need to be able to obtain precise performance measurements to make sure the circuit is fully functional in accordance with the performance specification of the operator. Unidirectional (1-way) and bi-directional (2-way) delay measurements are an essential performance measurement that needs to be obtained as part of the service activation. These measurements are also very useful to measure the performance of the Ethernet circuit while IN SERVICE.

These measurements, though useful, do not take into account the multiple segments that may exist within a network path and give no information to isolate the segment delay within the absolute path. To find such a segment over a multi-segment path requires numerous tests, excessive messaging and time.

There is a need to be able to discover a segment by segment latency along a path when an end-to-end latency measurement is requested and not increase messaging as a by-product of this segment by segment measurement.

An example of a unidirectional (1-way) measurement is illustrated in FIG. 1. When a unidirectional delay measurement is requested between network devices 101 and 102 along a network path 103, a test packet 104 is created and a timestamp 105 is inserted into the packet 104 denoting the time when the first bit of packet 104 is transmitted. When the packet 104 arrives at the network device 102, a second timestamp 106 is taken to denote the time when the last bit of the packet 104 arrives at the device 102. The difference in time between timestamp 105 and timestamp 106 denotes the delay in time to traverse the entire path between devices 101 and 102. All intermediate nodes between the devices are not deemed relevant. It is also to be noted that the clocks between the network devices must be precisely synchronized by one of the many methods known to one skilled in the art.

An example of a bi-directional (2-way) measurement is illustrated in FIG. 2. When a bi-directional delay measurement is requested between network devices 201 and 202 along a network path 203, a test packet 204 is created and a timestamp 205 is inserted into the packet 204 denoting the time when the first bit of the packet 204 is transmitted. When the packet 204 arrives at network device 202, a second timestamp 206 is taken to denote the time when the last bit of the packet 204 arrives at device 202. Then the addresses of the test packet 204 are modified and transmitted back to the device 201 containing the original timestamp 205, with the timestamp 206 and a timestamp 207 that denotes with the first bit of the packet 208 is transmitted on the network. When the final bit of the packet 208 arrives at the network device 201, a final timestamp 209 is taken. The difference in time between timestamp 205 and 206 ADDED to the difference in time between the timestamp 207 and 209 gives the total round-trip delay of the bi-directional path. Another method to determine the round-trip delay is to deduct the timestamp 205 from the timestamp 209. All intermediate nodes between the devices are not deemed relevant. It is also to be noted that the clocks between the network devices must be precisely synchronized by one of the many methods known to one skilled in the art.

SUMMARY OF THE INVENTION

In accordance with one embodiment, a method of determining the latency of path segments in a communication network that uses multi-bit data packets comprises generating a test packet for use in determining the latency of path segments in the network; transmitting the test packet from a first device coupled to the network; storing in the test packet the time when a preselected bit in the test packet is transmitted from the first device; when the test packet is received by a second device coupled to the network, storing in the second device at least one of (a) the time when a preselected bit in the test packet is received by the second device and (b) the difference between (i) the time when the preselected bit in the test packet is transmitted from the first device and (ii) the time when the test packet is received by the second device. In one implementation, the time when a preselected bit in the test packet is received by the second device is stored in the second device, and the latency of the path segment between the first and second devices is determined to be the difference between the two stored times. In another implementation, the difference between (i) the time when the preselected bit in the test packet is transmitted from the first device and (ii) the time when the test packet is received by the second device, is stored in the second device, and the latency of the path segment between the first and second devices is determined by retrieving the difference from the second device.

The test packet may be transmitted serially from the second device to a plurality of additional devices coupled to the network. Each time the test packet is received by one of the additional devices, the information stored in the additional device includes at least one of (a) the time when a preselected bit in the test packet is received by the additional device and (b) the difference between (i) the time when the preselected bit in the test packet is transmitted from the first device and (ii) the time when the test packet is received by the additional device. The test packet may also be returned from the second device to the first device, or from one of the additional devices to the first device via the same devices traversed by the test packet during transmission from the first device to the one additional device.

The test packet may be transmitted to and from the various devices while normal packets are being transported through the network.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

To allow the tracking of the delays of the individual segments of the end-to-end path of the circuit, a new field is defined within the packet that is used during the test. This new value stores the time stamp created when the first bit of the packet is transmitted for each segmented hop along the end-to-end path. This new value can be used by each device along the path to calculate the delay from the last device to itself, while preserving the information needed to determine the delay in the end-to-end path. This also allows devices that are not aware of this capability to operate normally. The intermediate hop devices can then be interrogated later to easily find the segment delay problem if the end-to-end path has an unacceptable delay measurement.

Figure 1:
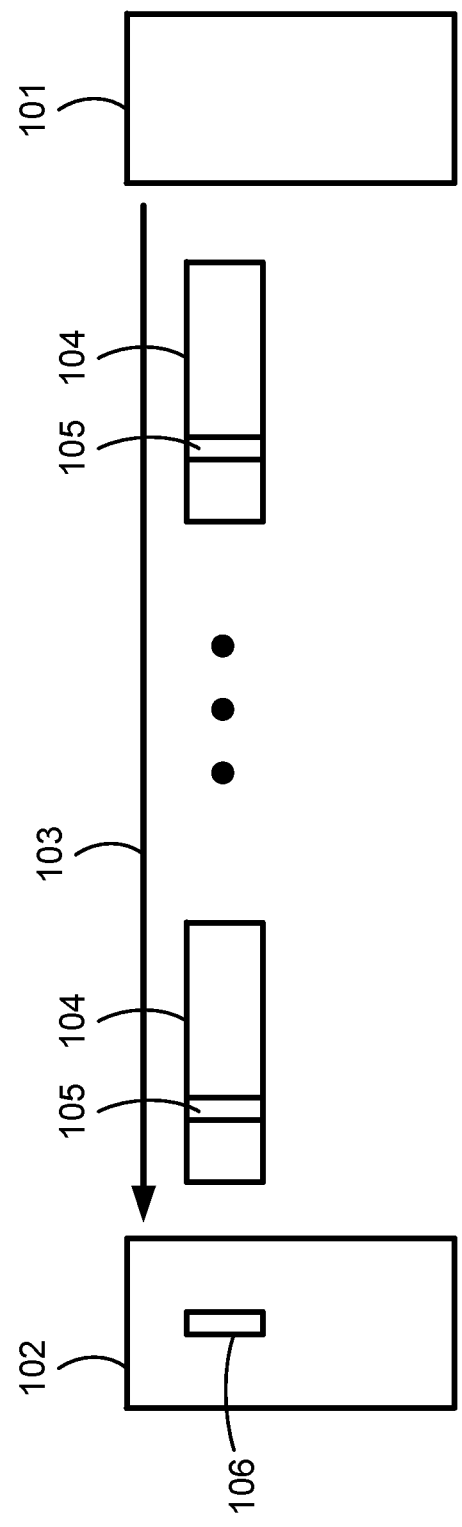
FIG. 1 is a diagrammatic illustration of a one-way latency measurement in a packet-based communication network.
Figure 2:
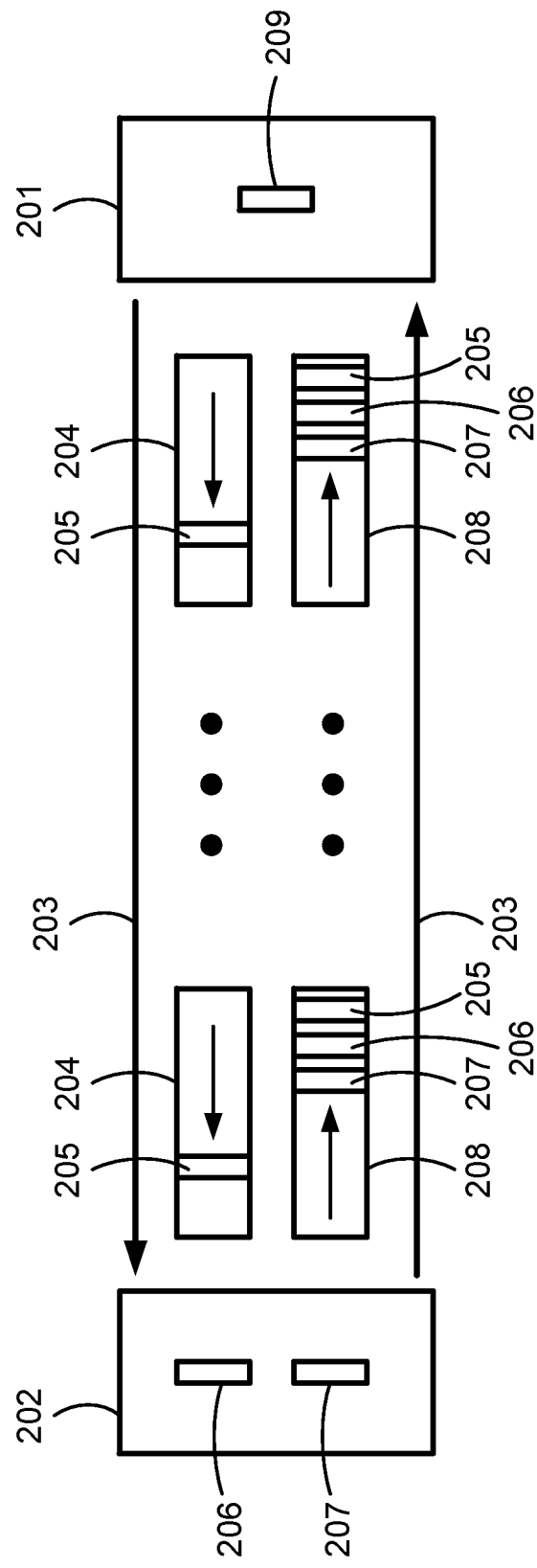
FIG. 2 is a diagrammatic illustration of a two-way latency measurement in a packet-based communication network.
Figure 3:
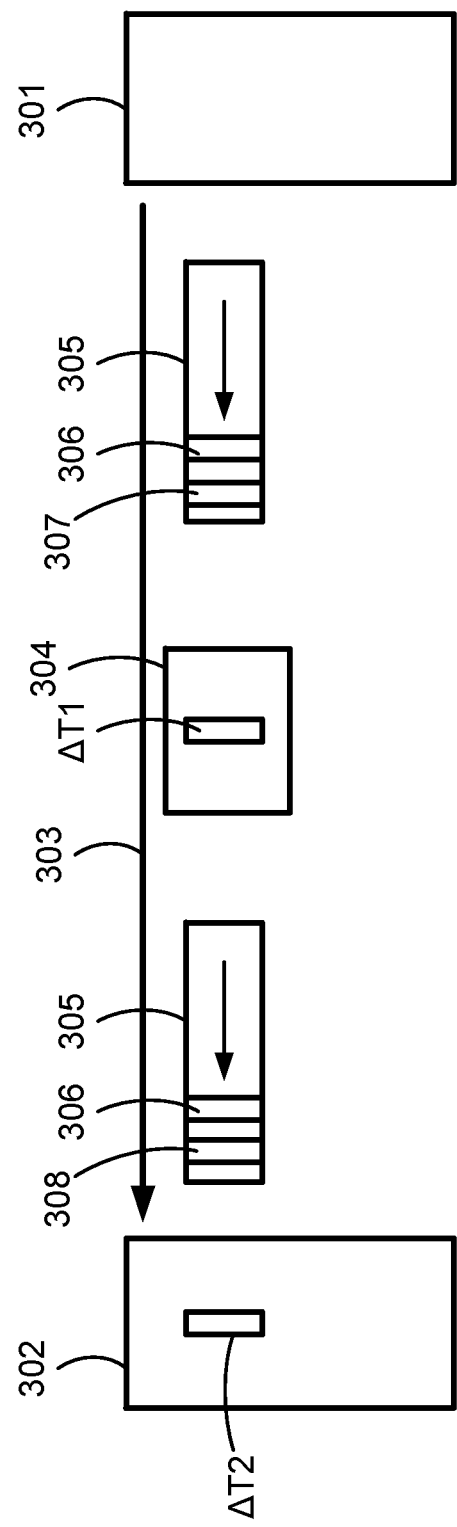
FIG. 3 is a diagrammatic illustration of one-way latency measurements for path segments, as well as the entire path, in a packet-based communication network.

FIG. 3 illustrates an example of a unidirectional (1-way) measurement. When a unidirectional delay measurement is requested between a pair of network devices 301 and 302 along a network path 303 that includes an intermediate network device 304, a test packet 305 is created and transmitted from the device 301 onto the path 303. A timestamp 306 is inserted into the packet 305 to denote the time when the first bit of the packet 305 is transmitted. A second timestamp field 307 is set at the same timestamp value, as this is the originating device.

The first network device to receive the packet 305 along the path 303 is the intermediate device 304. When the test packet 305 arrives at the device 304, the time difference $\Delta T1$ between the time when the last bit is received and the value in the timestamp 307 is calculated and stored in the network device 304. (Alternatively, the timestamp can be taken upon receiving the first bit of the packet 305.) This value $\Delta T1$ is the delay of the path segment from device 301 to device 304.

A new timestamp 308, denoting the time when the first bit of the packet 305 is transmitted from the device 304, is taken and stored in the field where the timestamp 307 had been stored.

When the packet 305 arrives at the end-point device 302, the time when the last bit arrives is recorded in the device 302, and the time difference $\Delta T2$ between the timestamp 308 and the recorded time can be stored in the device 302 as the delay of the path segment from device 304 to device 302. The time difference between the arrival time stored in device 302 and the time stored in 306 is the value of the end-to-end delay in the path 303.

Figure 3A:
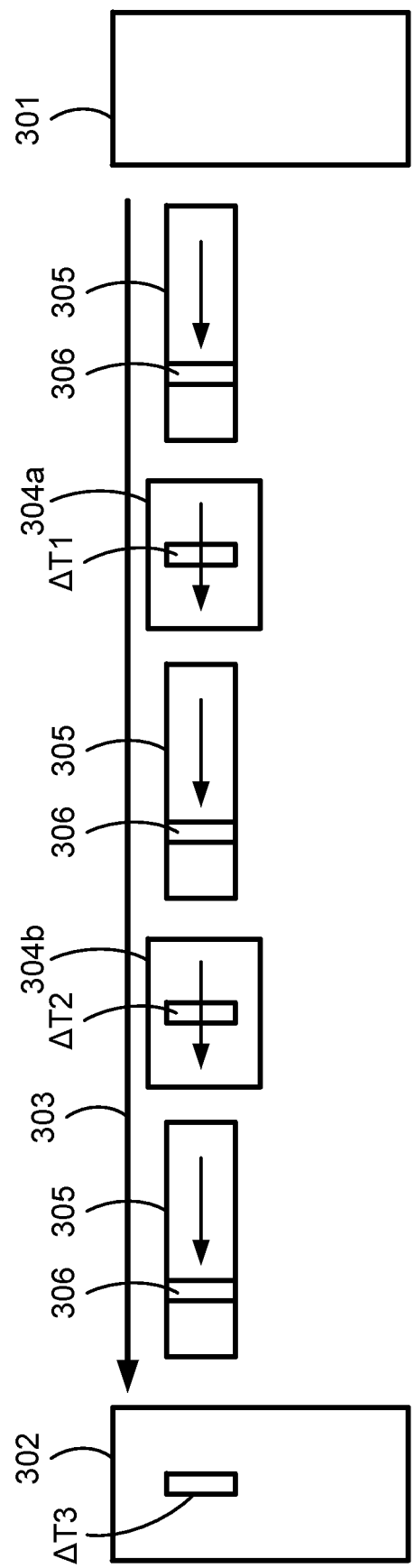
FIG. 3a is a diagrammatic illustration of modified one-way latency measurements for path segments, as well as the entire path, in a packet-based communication network.

FIG. 3a illustrates a modified embodiment of a unidirectional delay measurement made between network devices 301 and 302 along a network path 303 that includes two intermediate network devices 304a and 304b. A test packet 305 is created and transmitted from the first device 301 onto the path 303, and a timestamp 306 is inserted into the packet 305 denoting the time when the first bit of the packet is transmitted from the first device 301.

When the packet 305 arrives at the first intermediate device 304a, the time difference $\Delta T1$ between the time when the last bit is received by the device 304a and the time when the first bit was transmitted from the device 301 (the value in timestamp 306) is calculated and stored in the device 304a. This value $\Delta T1$ is the delay of the path segment from device 301 to device 304a. The test packet 305 is then forwarded to the next network device 304b in the test path.

When the packet 305 arrives at the third device 304b, the time difference $\Delta T2$ between the time when the last bit is received by the device 304b and the time when the first bit was transmitted from the device 301 (the value in timestamp 306) is calculated and stored in the device 304b. Alternatively, the timestamp can be taken upon receiving the first bit of the packet 305. The value $\Delta T2$ is the total delay of the path segments from device 301 to device 304b. The test packet 305 is then forwarded to the last network device 302 in the test path.

When the packet 305 arrives at the final device 302, the time difference $\Delta T3$ between the time when the last bit is received by the device 302 and the time when the first bit was transmitted from the device 301 (the value in timestamp 306) is calculated and stored in the device 302. This value is the total end-to-end delay of the path from device 301 to device 302. The stored time differences $\Delta T1$, $\Delta T2$ and $\Delta T3$ in the respective network devices 304a, 304b and 302 along the test path 303 can then be retrieved centrally by any of several well known techniques for retrieving data from distributed network devices.

Figure 4:
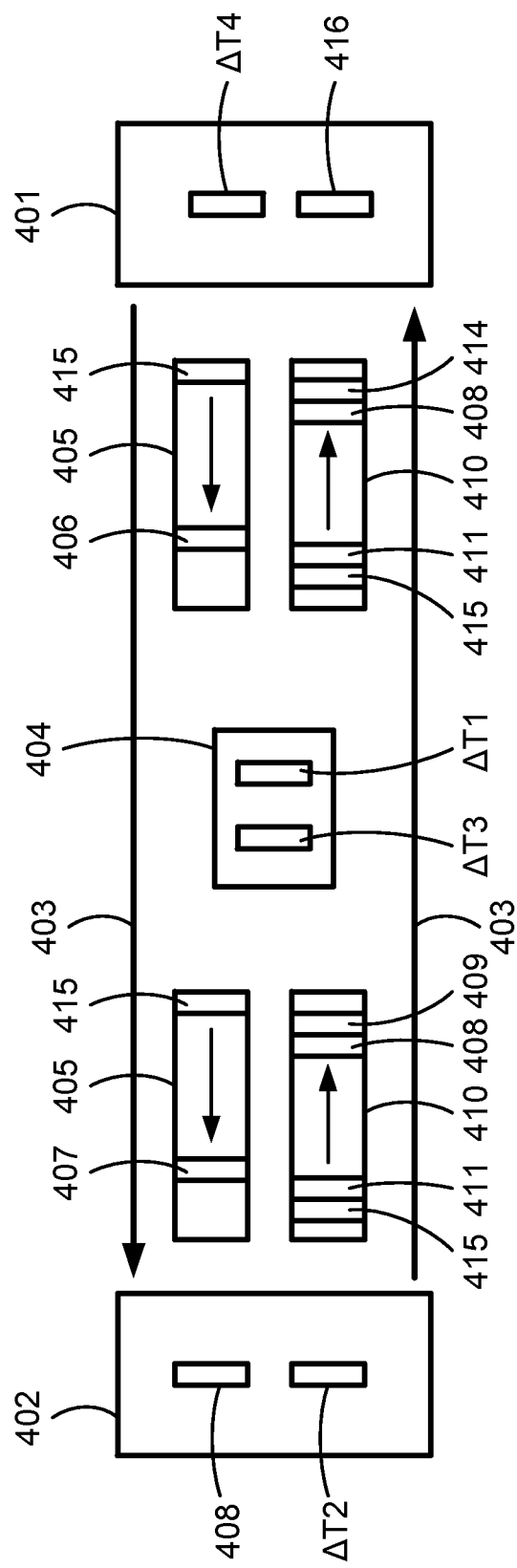
FIG. 4 is a diagrammatic illustration of two-way latency measurements for path segments, as well as the entire path, in a packet-based communication network.

In FIG. 4, when a bi-directional delay measurement is requested between network devices 401 and 402 along a network path 403, a test packet 405 is created and transmitted from the device 401 along the path 403. A timestamp 415 is inserted into the packet 405, denoting the time when the first bit of the packet 405 is transmitted. A second timestamp field 406 is set at the same value as the timestamp 415, as this is the originating device.

When the packet 405 arrives at an intermediate network device 404, the time difference $\Delta T1$ between the time when the last bit is received by the device 404 and the value in the timestamp 406 is calculated and stored in the device 404. This value $\Delta T1$ is the delay of the path segment from device 401 to device 404. A new timestamp 407, denoting the time when the first bit of the packet 405 is transmitted from the device 404, replaces the timestamp 406 previously stored in the packet 405.

When the packet 405 arrives at the third device 402, the time when the last bit in the packet 405 arrives at the device 402 is recorded in the device 402 as a timestamp 408. The time difference ΔT2 between timestamp 408 and the time stored in timestamp 407 is calculated and stored in the device 402. This value ΔT2 is the delay of the path segment from device 404 to device 402.

Next, the addresses of the original test packet 405 are reversed in a packet 410 that is transmitted in the reverse direction along the network path 403, from device 402 to device 401 via the intermediate device 404. The packet 410 still contains the original timestamp 415, the recorded timestamp 408 and new timestamps 409 and 411, both denoting the time when the first bit of the packet 410 is transmitted from the device 402.

When the packet 410 arrives at the intermediate network device 404, the time difference ΔT3 between the time when the last bit is received by the device 404 and the value in the timestamp 409 is calculated and stored in the device 404. This value ΔT3 is the delay of the path segment between from device 402 to device 404. A new timestamp 414, denoting the time when the first bit of the packet 415 is transmitted from the device 404 toward the device 401, replaces the timestamp 409 in the packet 410.

When the packet 410 arrives at the third device 401, which is the end point of the return path, the time when the last bit in the packet 410 arrives at the device 401 is recorded in the device 401 as a timestamp 416. The time difference ΔT4 between the recorded time 416 and the time stored in timestamp 414 is calculated and stored in the device 401. This value ΔT4 is the delay of the path segment between from device 404 to device 401.

Also, the difference in time between timestamp 415 and 408 ADDED to the difference in time between timestamp 411 and 416 gives the total round-trip delay of the bi-directional path. An alternative method to calculate the total round-trip delay is to deduct the timestamp 415 from timestamp 416. It is also to be noted that the clocks between the network devices must be precisely synchronized by one of the many methods known to one skilled in the art.

Figure 4A:
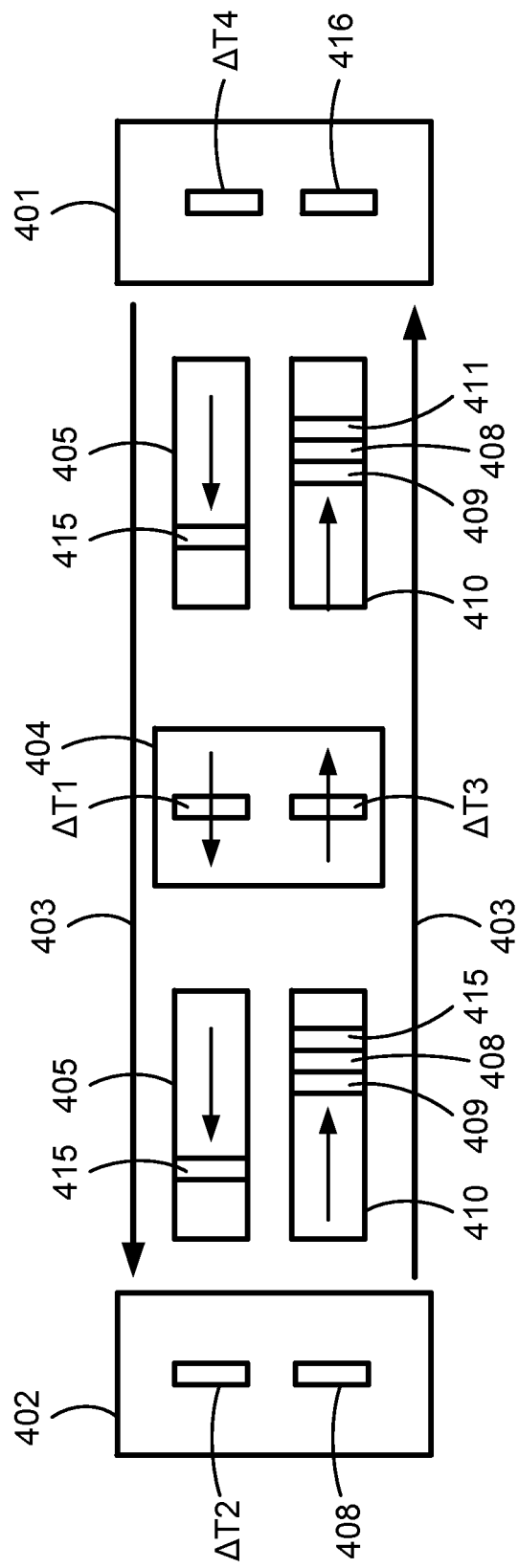
FIG. 4a is a diagrammatic illustration of modified two-way latency measurements for path segments, as well as the entire path, in a packet-based communication network.

In another embodiment illustrated in FIG. 4a, a two-way delay measurement is made between network devices 401 and 402 along a network path 403 that includes an intermediate network device 404. A test packet 405 is created at the first device 401, and a timestamp 415 is inserted into the packet 405 denoting the time when the first bit of the packet is transmitted from the first device 401. When the packet 405 arrives at the second device 404, the time difference ΔT1 between the time when the last bit is received by the device 404 and the time when the first bit was transmitted from the device 401 (the value in timestamp 415) is calculated and stored in the device 404. This value ΔT1 is the segment delay of the path segment from device 401 to device 404. The test packet 405 is then forwarded to the next network device 402 in the test path.

When the packet 405 arrives at the third device 402, the time difference ΔT2 between the time when the last bit is received by the device 402 (stored as timestamp 408) and the time when the first bit was transmitted from the device 401 (the value in timestamp 415) is calculated and stored in the device 402. The value ΔT2 is the total segment delay of the path segment from device 401 to device 402.

Then the addresses of the original test packet 405 are reversed in a packet 410 that is transmitted to the device 401 in the reverse direction along the network path 403. A timestamp 409 is inserted into the packet 410, denoting the time when the first bit of the packet is transmitted from the device 402 onto the return path. Timestamps 415 and 408 are also inserted into the packet. When the packet 410 arrives at the intermediate device 404, the time difference ΔT3 between the time when the last bit is received by the device 404 and the time when the first bit was transmitted from the device 402 (the value in timestamp 409) is calculated and stored in the device 404. This value ΔT3 is the delay of the path segment from device 402 to device 404. The test packet 410 is then forwarded to the network device 401, which is the end point of the path being tested.

When the packet 410 arrives at the device 401, the time difference ΔT4 between the time when the last bit is received by the device 401 (stored as timestamp 416 in device 401) and the time when the first bit was transmitted from the device 402 (the value in timestamp 409) is calculated and stored in the device 401. This value ΔT4 is the delay of the path from device 402 to device 401.

The stored time difference values ΔT1, ΔT2, ΔT3, and ΔT4 stored in the network devices 401, 402 and 404 along the test path can be retrieved centrally. It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Also, the difference in time between timestamp 415 and 408 ADDED to the difference in time between timestamp 409 and 416 gives the total round-trip delay of the bi-directional path. An alternative method to calculate the total round-trip delay is to deduct the timestamp 415 from timestamp 416. It is also to be noted that the clocks between the network devices must be precisely synchronized by one of the many methods known to one skilled in the art.

The invention claimed is:

1. A method of determining a latency of a network path in a communication network having a plurality of segments, the method comprising:
   transmitting a first test packet generated at a first communication device of a plurality of communication devices to an intermediate device over a first segment of the plurality of segments of the network path, wherein the first test packet stores a first timestamp and a second timestamp indicative of a time a first bit of the first test packet is transmitted to the intermediate device over the first segment;
   computing a first difference between a time when a last bit of the first test packet is received at the intermediate device and the second timestamp;
   storing the first time difference in the intermediate device as a one-way latency between the first communication device and the intermediate device;
   transmitting the first test packet from the intermediate device to a second communication device along a second segment;
   replacing the second timestamp stored in the first test packet with a third timestamp indicating a time when the first bit of the first text packet is transmitted from the intermediate device;
   computing a second time difference between a time when the last bit of the first test packet is received at the second communication device and the third timestamp;

storing the second time difference in the second communication device as an end-to-end delay;
generating a second test packet by reversing a plurality of addresses associated with the first test packet; and
transmitting the second test packet to the first communication device along the network path in a reverse direction of the first test packet.

2. The method of claim 1, wherein the first time difference and the second time difference are retrieved from a central location by plurality of distributed network devices.

3. The method of claim 1, wherein the second test packet stores the first timestamp and a fourth timestamp indicating the time when the last bit of the first test packet is received at the second communication device.

4. The method of claim 3, wherein the second test packet further stores a fifth timestamp and sixth timestamp both indicating when a first bit of the second test packet is transmitted to the first communication device.

5. The method of claim 1, further comprising:
determining a round-trip latency after the second test packet is transmitted from the second communication device to the first communication device.

6. The method of claim 5, wherein determining the round-trip latency comprises:
determining a third time difference between the second timestamp and the time when the last bit of the first test packet is received at the second communication device.

7. The method of claim 6, wherein determining the round-trip latency comprises:
determining a fourth time difference between a time when a last bit in the second test packet arrives at the first communication device and a time when a first bit in the second test packet is transmitted from the second communication device.

8. The method of claim 7, wherein determining the round-trip latency further comprises:
adding the third time difference the fourth time difference.

9. The method of claim 7, wherein the first time difference and the fourth time difference are retrieved from a central location by a plurality of distributed network devices.

10. The method of claim 5, wherein determining the round-trip latency comprises:
deducting the second timestamp from a time when a last bit in the second test packet arrives at the first communication device.

11. A system for determining a latency of a network path in a communication network having at least a plurality of segments, the system comprising:
a first communication device, an intermediate device, and a second communication device, wherein the first communication device:
generates and transmits a first test packet to the intermediate device over a first segment of the plurality of segments of the network path, wherein the first test packet stores a first timestamp and a second timestamp indicative of a time a first bit of the first test packet is transmitted to the intermediate device over the first segment;
wherein the intermediate device:
computes a first time difference between a time when a last bit of the first test packet is received at the intermediate device and the second timestamp;
stores the first time difference in the intermediate device to the second communication device along a second segment; and
transmits the first test packet from the intermediate device to the second communication device along a second segment; and
replaces the second timestamp stored in the first test packet with a third timestamp indicating a time when the first bit of the first test packet is transmitted from the intermediate device;
wherein the second communication device:
computes a second time difference between a time when the last bit of the first test packet is received at the second communication device and the third timestamp;
stores the second time difference in the second communication device as an end-to-end delay;
generates a second test packet by reversing a plurality of addresses associated with the first test packet; and
transmits the second test packet to the first communication device along the network path in a reverse direction of the first test packet.

12. The system of claim 11, wherein the first time difference and the second time difference are retrieved from a central location by a plurality of distributed network devices.

13. The system of claim 11, wherein the second test packet stores the first timestamp and a fourth timestamp indicating the time when the last bit of the first test packet is received at the second communication device.

14. The system of claim 13, wherein the second test packet further stores a fifth timestamp and a sixth timestamp both indicating when the first bit of the second test packet is transmitted to the first communication device.

15. The system of claim 11, wherein the first communication device further determines a round-trip latency after the second test packet is transmitted from the second communication device to the first communication device.

16. The system of claim 15, wherein the first communication device determines a round-trip latency by:
determining a third time difference between the second timestamp and the time when the last bit of the first test packet is received at the second communication device.

17. The system of claim 16, wherein the first communication device determines a round-trip latency by:
determining a fourth time difference between a time when a last bit in the second test packets arrives at the first communication device and a time when a first bit is transmitted from the second communication device.

18. The system of claim 17, wherein the first communication device determines a round-trip latency further by:
adding the third time difference and the fourth time difference.

19. The system of claim 17, wherein the third time difference and the fourth time difference are retrieved from a central location by a plurality of distributed network devices.

20. The system of claim 15, wherein the first communication device determines the round-trip latency by:
deducting the second timestamp from a time when a last bit in the second test packet arrives at the first communication device.

* * * * *